(12) United States Patent
Dennis et al.

(10) Patent No.: US 7,942,443 B2
(45) Date of Patent: *May 17, 2011

(54) AIRBAG SYSTEM

(75) Inventors: Nathaniel J. Dennis, Grand Blanc, MI (US); Brent T. Elkin, Imlay City, MI (US); Amy L. Klinkenberger, Highland, MI (US)

(73) Assignee: TK Holdings Inc., Auburn Hills, MI (US)

( * ) Notice: Subject to any disclaimer, the term of this patent is extended or adjusted under 35 U.S.C. 154(b) by 146 days.

This patent is subject to a terminal disclaimer.

(21) Appl. No.: 12/219,624

(22) Filed: Jul. 24, 2008

(65) Prior Publication Data

US 2010/0308567 A9    Dec. 9, 2010

Related U.S. Application Data

(63) Continuation-in-part of application No. 11/707,264, filed on Feb. 16, 2007, now Pat. No. 7,506,892.

(60) Provisional application No. 60/828,304, filed on Oct. 5, 2006, provisional application No. 60/743,319, filed on Feb. 17, 2006.

(51) Int. Cl.
*B60R 21/205* (2011.01)
*B60R 21/231* (2011.01)

(52) U.S. Cl. .............. 280/743.2; 280/729; 280/730.1; 280/732; 280/743.1

(58) Field of Classification Search .............. 280/743.2, 280/730.1, 732, 743.1, 729; *B60R 21/205, B60R 21/231*
See application file for complete search history.

(56) References Cited

U.S. PATENT DOCUMENTS

| | | | |
|---|---|---|---|
| 2,834,606 A | 5/1958 | Bertrand | |
| 3,610,657 A * | 10/1971 | Cole | 280/729 |
| 3,642,303 A | 2/1972 | Irish et al. | |
| 3,664,682 A | 5/1972 | Wycech | |
| 3,675,942 A * | 7/1972 | Huber | 280/738 |
| 3,767,225 A | 10/1973 | Mazelsky | |
| 3,784,225 A | 1/1974 | Fleck et al. | |
| 3,788,665 A * | 1/1974 | Noll et al. | 280/729 |
| 3,819,204 A | 6/1974 | Oka et al. | |
| 4,043,572 A | 8/1977 | Hattori et al. | |
| 4,169,613 A | 10/1979 | Barnett | |
| 4,265,468 A * | 5/1981 | Suszko et al. | 280/729 |
| 4,290,627 A | 9/1981 | Cumming et al. | |
| 4,300,894 A * | 11/1981 | Cumming et al. | 493/210 |
| 4,360,223 A | 11/1982 | Kirchoff | |
| 5,240,283 A | 8/1993 | Kishi et al. | |
| 5,310,214 A | 5/1994 | Cuevas | |
| 5,480,184 A | 1/1996 | Young | |
| 5,513,877 A | 5/1996 | MacBrien et al. | |

(Continued)

*Primary Examiner* — Paul N Dickson
*Assistant Examiner* — Keith Frisby
(74) *Attorney, Agent, or Firm* — Foley & Lardner LLP

(57) ABSTRACT

An airbag module for a vehicle includes an airbag cushion, an inflator to inflate the airbag cushion, a sleeve connected to the airbag cushion and a tether configured to pass through the sleeve. A first end of the tether is anchored to a portion of the airbag cushion, module, or a structure of the vehicle and a second, opposite end of the tether is capable of passing through at least a portion of the sleeve during deployment of the airbag. The tether and sleeve are configured to initially restrain the deployment of the airbag cushion to provide a knee bolster, after which the tether is configured to unlace within the sleeve to release the restraint on the airbag cushion.

19 Claims, 16 Drawing Sheets

U.S. PATENT DOCUMENTS

| | | | |
|---|---|---|---|
| 5,558,300 | A | 9/1996 | Kalberer et al. |
| 5,577,765 | A | 11/1996 | Takeda et al. |
| 5,752,715 | A | 5/1998 | Pripps et al. |
| 5,775,729 | A | 7/1998 | Schneider |
| 5,775,730 | A | 7/1998 | Pripps et al. |
| 5,803,485 | A | 9/1998 | Acker et al. |
| 5,971,431 | A * | 10/1999 | Wohllebe et al. ............. 280/732 |
| 6,059,312 | A | 5/2000 | Staub et al. |
| 6,095,273 | A | 8/2000 | Aboud et al. |
| 6,158,765 | A | 12/2000 | Sinnhuber |
| 6,209,908 | B1 | 4/2001 | Zumpano |
| 6,213,496 | B1 | 4/2001 | Minami et al. |
| 6,224,088 | B1 | 5/2001 | Lohavanijaya |
| 6,276,716 | B1 | 8/2001 | Kato |
| 6,431,583 | B1 | 8/2002 | Schneider |
| 6,431,586 | B1 | 8/2002 | Eyrainer et al. |
| 6,505,851 | B2 | 1/2003 | Frisch |
| 6,513,829 | B1 | 2/2003 | Zumpano |
| 6,523,855 | B2 | 2/2003 | Musiol et al. |
| 6,536,799 | B2 | 3/2003 | Sinnhuber et al. |
| 6,616,177 | B2 | 9/2003 | Thomas et al. |
| 6,676,147 | B2 | 1/2004 | Ozaki et al. |
| 6,679,522 | B2 | 1/2004 | Igawa |
| 6,702,322 | B2 | 3/2004 | Eyrainer et al. |
| 6,709,009 | B1 | 3/2004 | Michael et al. |
| 6,836,715 | B2 | 12/2004 | Sakai et al. |
| 7,070,201 | B2 | 7/2006 | Song et al. |
| 7,506,892 | B2 * | 3/2009 | Klinkenberger et al. .. 280/743.2 |
| 2005/0023811 | A1* | 2/2005 | Thomas ........................ 280/736 |
| 2006/0103121 | A1* | 5/2006 | Song et al. .................... 280/732 |
| 2006/0249943 | A1* | 11/2006 | Bauer et al. ................. 280/743.2 |
| 2007/0182144 | A1* | 8/2007 | Aranzulla et al. ......... 280/743.2 |
| 2007/0205590 | A1* | 9/2007 | Klinkenberger et al. .. 280/743.2 |

* cited by examiner

AIRBAG SYSTEM

CROSS-REFERENCE TO RELATED APPLICATIONS

The present application claims priority to and is a continuation-in-part application of U.S. application Ser. No. 11/707,264 that was filed Feb. 16, 2007 (now U.S. Pat. No. 7,506,892), which claims priority to U.S. Provisional Application No. 60/828,304 filed on Oct. 5, 2006 and U.S. Provisional Application No. 60/743,319 filed on Feb. 17, 2006.

BACKGROUND

The present invention relates generally to the field of airbags. More specifically, the present invention relates to knee, chest and head airbags using a tether and sleeve to control the shape of an airbag during inflation.

Airbags are provided in vehicles to protect occupants from injury in the event of a vehicle crash. Knee airbags in particular help prevent the legs of occupants from injury by preventing the legs from hitting the dash or an instrument panel in the event of a frontal crash.

Under certain circumstances, it is desirable to deploy a vehicle airbag in what is known as a "low risk deployment" (LRD) mode. LRD modes are typically required when there is a chance that a deploying airbag may contact an out-of-position ("OOP") occupant or, in certain cases, a rear facing infant seat (RFIS). Typically, airbag systems are designed with electronic occupant sensing systems or airbag suppression mechanisms combined with appropriate inflator output controls to avoid such situations.

Conventional airbag systems either proposed or in production employ some form of vent in the airbag cushion or module which are mechanically linked to an active or passive release system. Other conventional airbag systems also employ some form of bag restraint tether alone or in combination with a venting system.

In light of the above, there remains a continuing need in the art for improved airbag systems that are simple in design and easy to operate. There is also a need in the art for improved airbag systems that exhibit improved performance. Moreover, there is a need in the art for an airbag system that will still be filled with relatively high pressure inflation gas which would offer significant occupant impact protection, even though the airbag cushion may not have deployed to a full volume before being impacted by an occupant.

SUMMARY

One exemplary embodiment relates to an airbag module for a vehicle including an airbag cushion, an inflator to inflate the airbag cushion, a sleeve connected to the airbag cushion and a tether configured to pass through the sleeve. A first end of the tether is anchored to a portion of the airbag cushion, module, or a structure of the vehicle and a second, opposite end of the tether is capable of passing through at least a portion of the sleeve during deployment of the airbag. The tether and sleeve are configured to initially restrain the deployment of the airbag cushion to provide a knee bolster, after which the tether is configured to unlace within the sleeve to release the restraint on the airbag cushion.

Another exemplary embodiment relates to an airbag module for a vehicle including an airbag cushion having a first portion and a second portion larger than the first portion. The airbag module also includes an inflator provided in fluid communication with the airbag cushion. The airbag cushion is deployed initially in a restrained state so that only the first portion of the airbag cushion is inflated upon initial deployment of the airbag cushion until the airbag unlaces to deploy the second portion of the airbag cushion. The first portion is configured to provide protection to the knees of an occupant and the second portion of the airbag cushion is configured to provide protection to the upper body of the occupant.

Another exemplary embodiment relates to an airbag system for protecting a vehicle occupant including an airbag cushion having a first portion and a second portion larger than the first portion and an inflator to inflate the airbag cushion. The airbag system also includes a housing provided in a lower portion of a dash of the vehicle and configured to receive the airbag cushion in an un-deployed state. The airbag is deployed in a restrained state such that only the first portion of the airbag is inflated to provide protection to the knees of the occupant, after which the airbag unlaces to deploy the second portion of the airbag in combination with the first portion of the airbag to provide protection to the occupant.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 2(*b*) shows the cross sectional view of the airbag module of FIG. 1 in which an alternate arrangement of the tether is shown.

DETAILED DESCRIPTION

Various disclosed embodiments address the problems described above and relate to a low risk deployment device such as an airbag module which employs a controllable cushion shaped restraint tether to modify the performance characteristics of the vehicle airbag. The airbag module includes a housing, an inflatable airbag cushion being stored in an un-deployed position in the housing and an inflator that inflates the airbag cushion. The inflator is in communication with the airbag cushion. A tether element is provided surrounding an inside portion of the airbag cushion and restrains the airbag cushion during an initial deployment. A control mechanism is provided to release the tether element.

One aspect relates to an airbag cushion (sometimes referred to as "airbag" or "cushion") that uses a cushion shaping sleeve and a pyrotechnically controlled tether combination to modify the deployment characteristics of the cushion.

Figure 1:
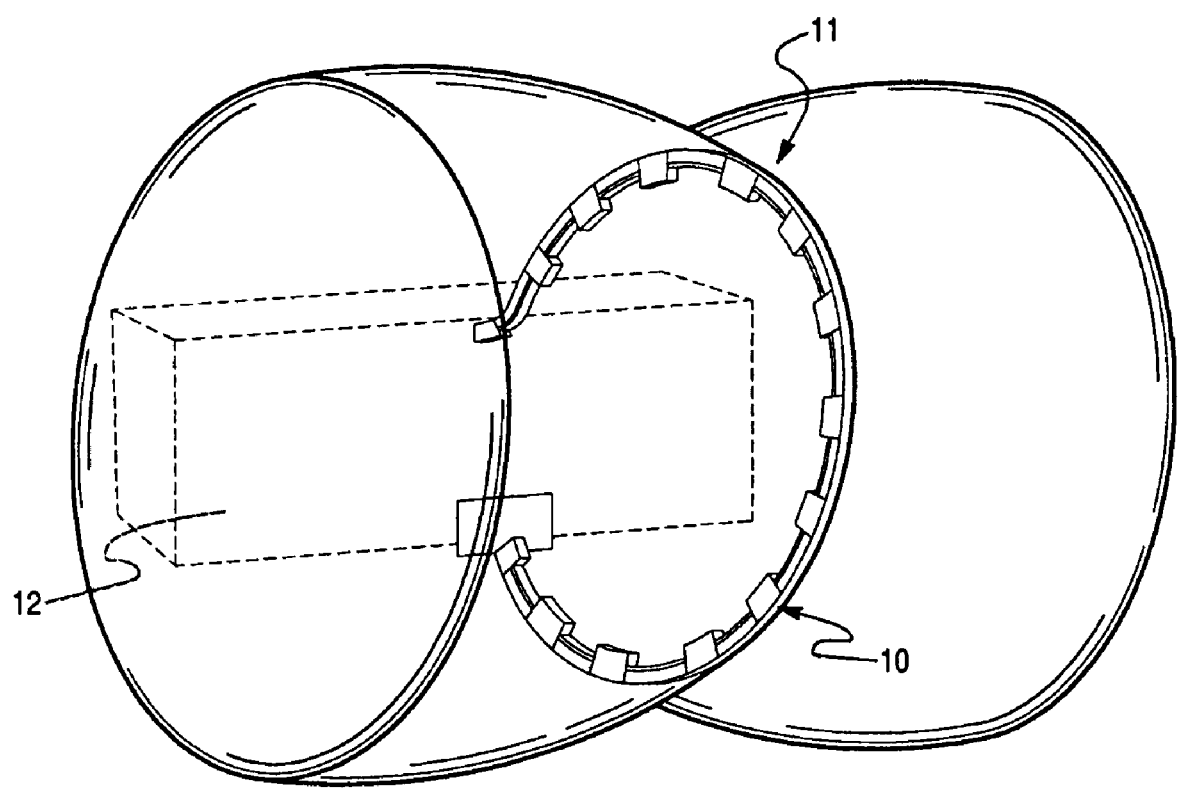
FIG. 1 is a diagram which shows an airbag module with a single internal tether.

FIGS. 1-8 illustrate a first aspect of exemplary embodiments. FIG. 1 is a diagram which shows an airbag module with a single internal tether according to one exemplary embodiment. As illustrated, the airbag module includes a housing 12 and an inflatable airbag cushion 11. When not inflated, the airbag cushion 11 is provided within the housing 12.

By way of example only, and not a limitation, the airbag cushion 11 may be a standard airbag cushion or a cushion including multiple lobes or inflatable chambers such as, for example, a twin or dual lobe type cushion. The airbag cushion 11 is provided with an internal tether 10. It is to be understood that the internal tether 10 may be formed in a manner such that the airbag cushion 11 is restrained during an initial deployment to provide a low risk deployment function. Thus, by way of example as illustrated in FIG. 1, the internal tether 10 surrounds a central section of the airbag cushion 11 and restrains the airbag cushion 11 during an initial deployment to provide the low risk deployment function. Alternatively, the internal tether 10 may surround an offset section of the airbag cushion 11 to provide the same low risk deployment function. Alternatively, the tether 10 may be in a substantially horizontal position.

Figure 2A:
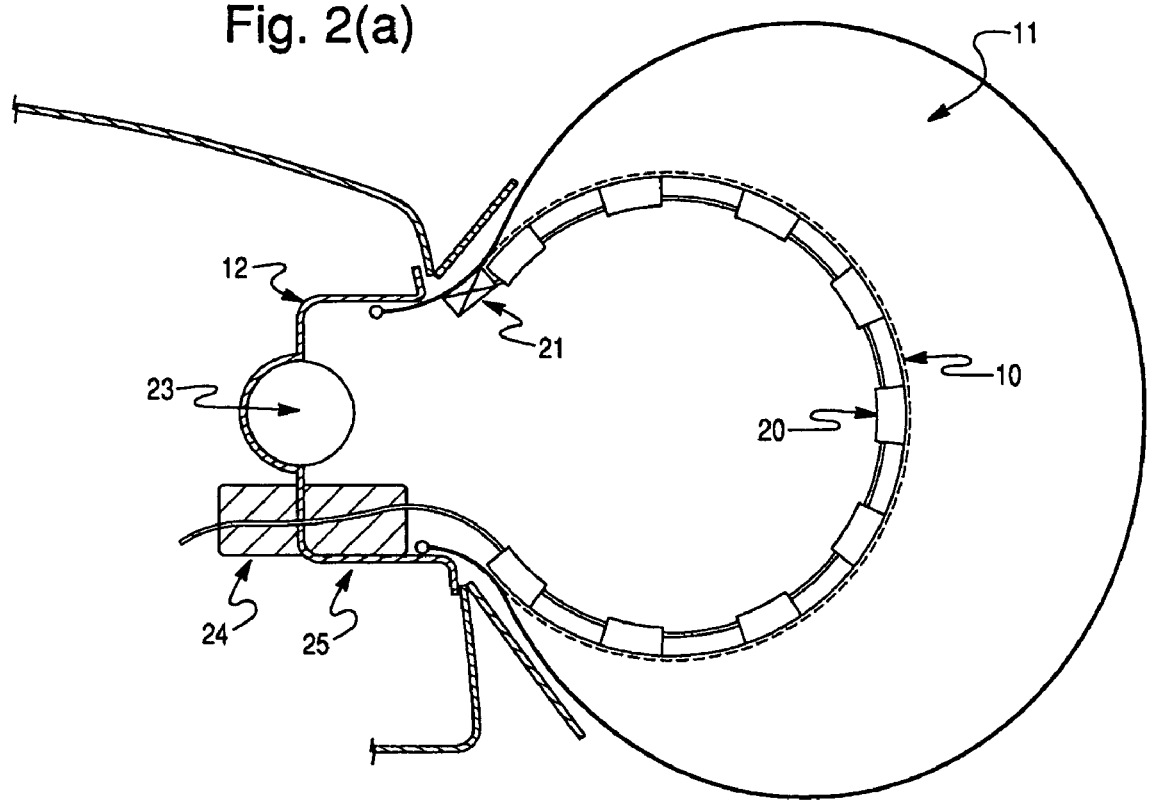
FIG. 2(*a*) shows the cross sectional view of the airbag module illustrated in FIG. 1 according to an embodiment.

Referring to FIG. 2(a), a diagram of the cross sectional view of the airbag module illustrated in FIG. 1 is illustrated. As shown, the airbag module is provided in a "mid-mount" position (in the instrument panel) and further includes tether guide loops 20 provided inside the airbag cushion 11, a tether anchor point 21, an inflator 23, and tether releases 24 and 25 which are provided inside or outside of the airbag module. As illustrated, the airbag cushion 11 is held in communication with the inflator 23. The mid-mount position is exemplary only. The structure and arrangement of the module may be applicable to other positions such as, for example, a top mount position in which the airbag deploys out of the top of the instrument panel.

Figure 2B:
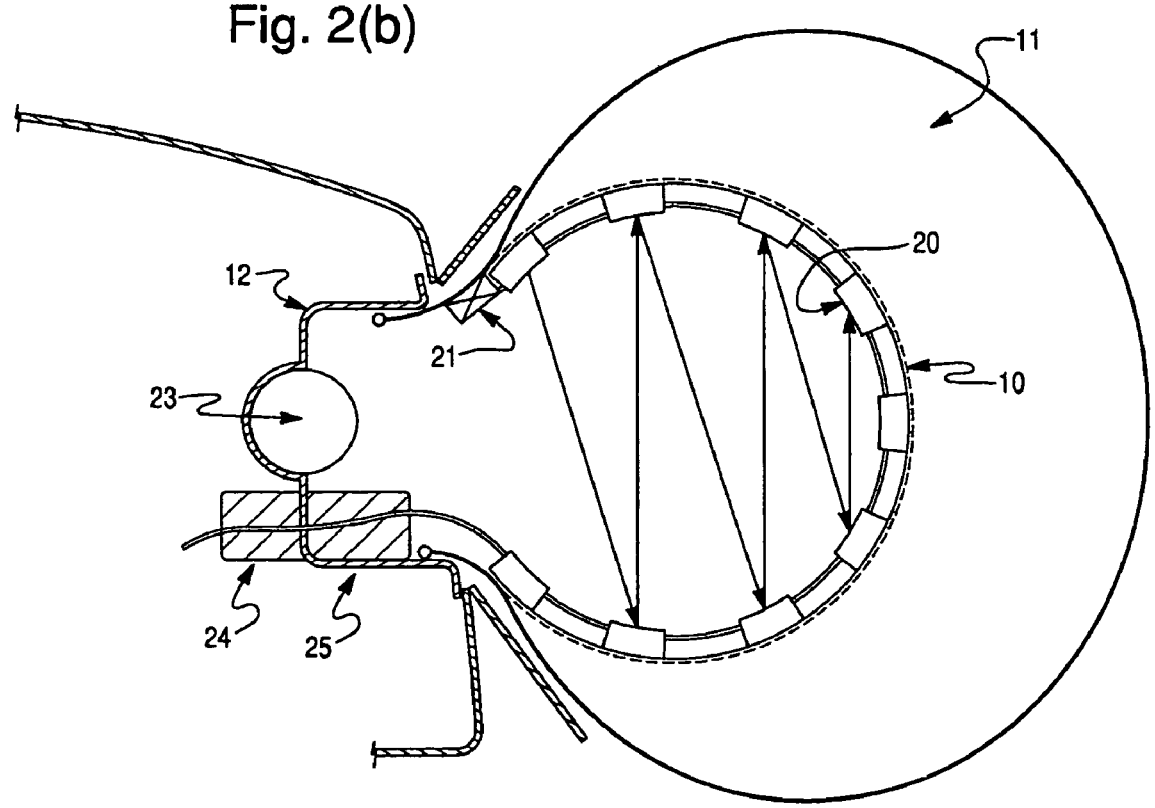

According to another embodiment, such as shown in FIG. 2(b), the tether 10 may be routed such that it does not follow the inner contour or shape of the airbag cushion. Rather, the tether 10 may be routed in a zig-zag or alternating manner, such as indicated by the arrows in FIG. 2(b), inside the airbag cushion 11 to provide restraint at various points. This zig-zag route allows a variety of restrained airbag shapes to be realized based on the tether routing employed. Various portions of the airbag cushion 11 can be restrained or allowed to bulge depending on the performance requirements. FIG. 2(b) illustrates one exemplary route of the tether 10. It will be recognized that the tether may follow any other suitable route.

According to an embodiment, the internal tether 10 may be released or activated by a variety of passive or active control techniques. By way of example only, the internal tether 10 may be passively released by a variety of devices which release or cut the internal tether 10 through the use of a secondary control tether or release cord mounted within the airbag cushion 11 or which are an integral part of the airbag cushion 11 as explained in greater detail below. Alternatively, the internal tether 10 may be actively released by a dual stage inflator gas cutting or a micro-gas generator (MGG) cut or release mechanism. The MGG may be activated by a simple timer, a velocity sensor, an occupant sensing system or any other similar control system.

Figure 3:
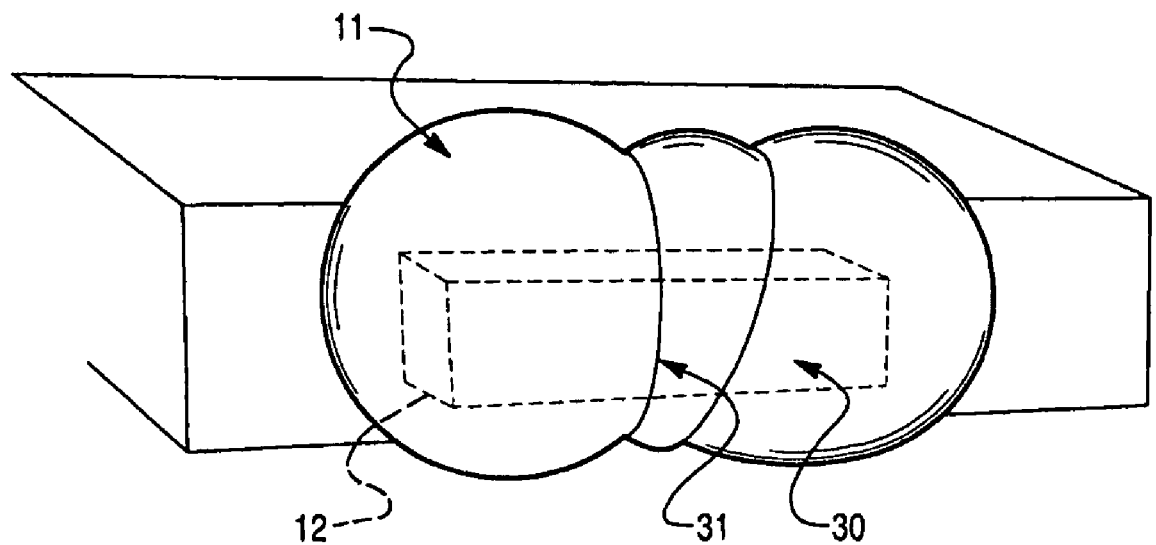
FIG. 3 is a diagram which shows an airbag module incorporating multiple internal tethers having single or multiple release points.
Figure 4:
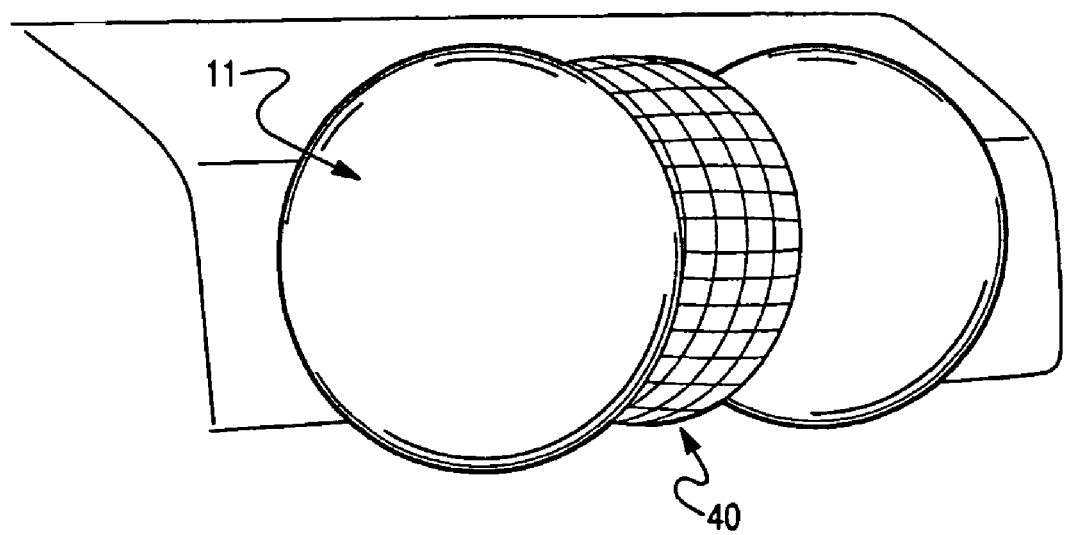
FIG. 4 is a diagram which shows an airbag module incorporating a band or strap configuration tether having single or multiple release points.

Referring to FIGS. 3 and 4, these figures illustrate alternative embodiments of an airbag module. As illustrated in FIG. 3, the two internal tethers 30 and 31 are provided around the inside of the airbag cushion 11. The two internal tethers 30 and 31 may include a single or multiple release points. While the exemplary airbag cushion 11 includes two internal tethers 30 and 31, it is to be understood that the number of internal tethers in no way limits the present disclosure. Accordingly, it is to be understood that the disclosed airbags will have equal applicability to three or more internal tethers.

FIG. 4 illustrates another alternative embodiment of an airbag module incorporating a band or strap configuration as the internal tether 40. The band or strap configuration for the internal tether 40 may include a single or multiple release points. While the exemplary airbag cushion includes a band or strap configuration for the internal tether 40, it is to be understood that the material used is in no way limiting. Accordingly, it is to be understood that the airbag tether may have equal applicability using a variety of materials including for example, cables, straps, cords, etc.

Figure 5:
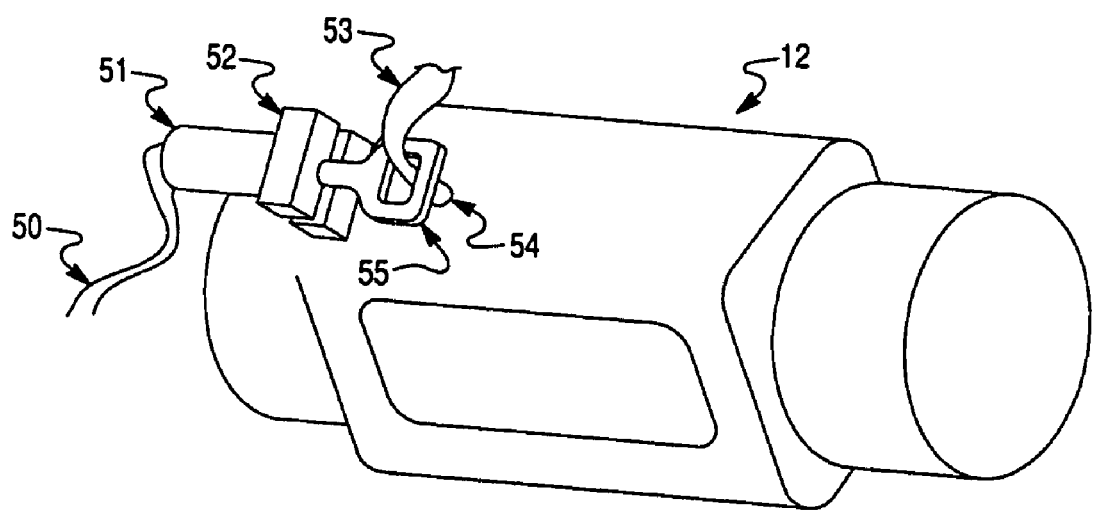
FIG. 5 shows a pyro-technic hold-release mechanism.

FIG. 5 illustrates a pyro-technic hold-release mechanism according to one embodiment of the present invention. The pyro-technic hold-release mechanism includes a pyro housing 51, a clamp section 52, a connector/wiring 50 and hook/clamp 55. A fabric tether 53 protrudes from a tether exit hole 54 of the housing 12. The fabric tether 53 is then provided through the hook/clamp 55. As illustrated, the hook/clamp 55 is in a released or unclamped position.

Figure 6:
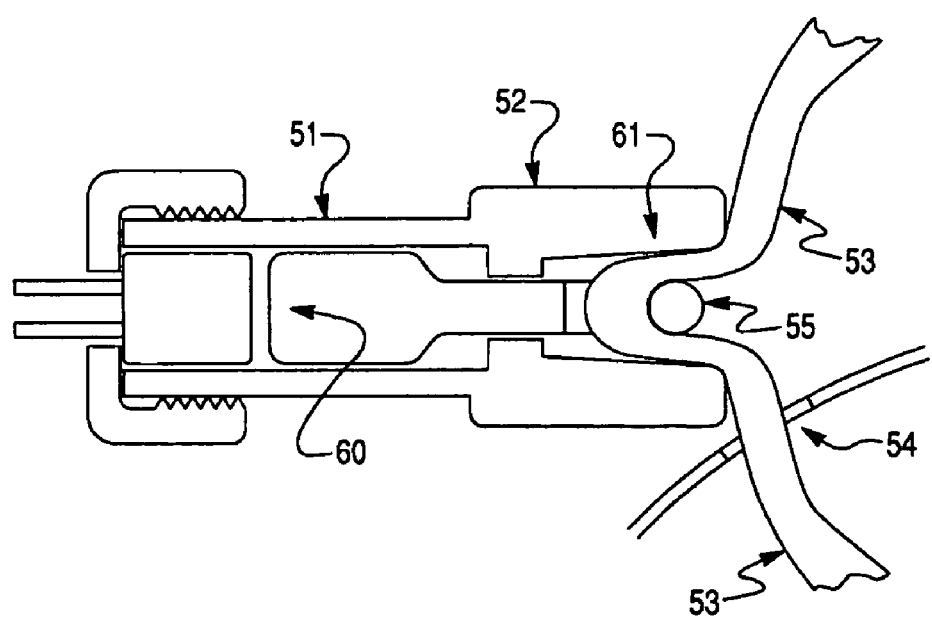
FIG. 6 is a diagram which shows the cross sectional view of the pyro-technic hold release mechanism illustrated in FIG. 5 with a fabric tether in a clamped position.

FIG. 6 is a diagram which shows the cross sectional view of the pyro-technic hold-release mechanism illustrated in FIG. 5 with the fabric tether in a clamped position. As illustrated, the pyro-technic hold-release mechanism is in the tether clamped position with the fabric tether 53 clamped by the clamp section 52. Reference numeral 61 shows the clamped area of the fabric tether 53. Provided within the pyro housing 51 is a piston area 60 which is part of the hook/clamp 55.

Figure 7:
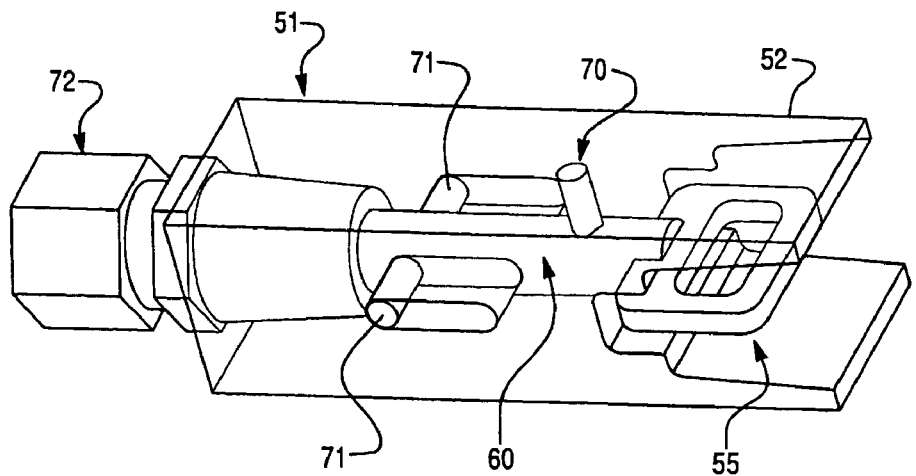
FIG. 7 is a diagram which shows an alternative embodiment of a hold-release mechanism.

FIG. 7 is a diagram which shows an alternative embodiment of a hold-release mechanism. As shown, the hold-release mechanism further includes a pin-steel roll travel limiting 71 provided on two sides of the piston area 60 and a holder housing initiator 72, provided on an upper portion of the piston area 60 near the hook/clamp 55. A holder housing initiator 72 is provided at an opposite end of the clamp section 52.

Figure 8:
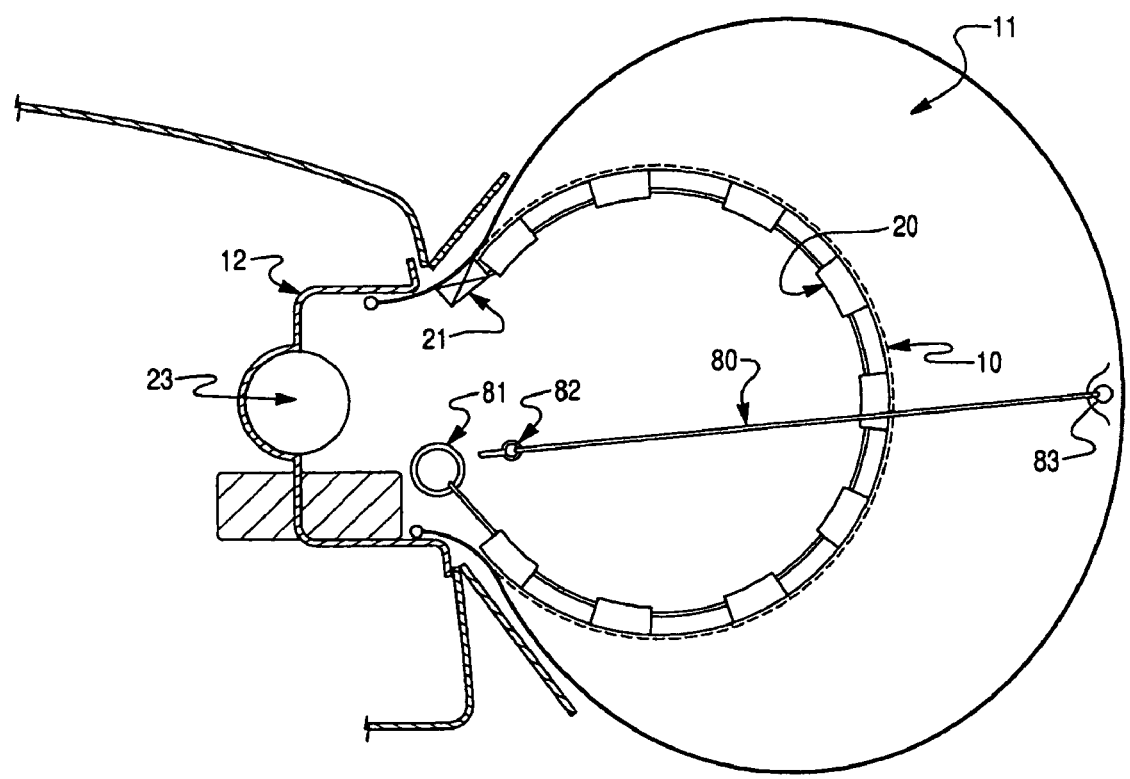
FIG. 8 is a cross sectional view of an airbag module incorporating a mechanical tether release.

Referring to FIG. 8, an exemplary construction of an airbag module incorporating a mechanical tether release according to an alternative embodiment is shown. The mechanical tether release is a passive, excursion based tether internal to the airbag cushion 11 and may be employed in an airbag module which is not operated in combination with an occupant sensing or detection system. This cross-sectional view of the airbag module incorporates a secondary release tether 80 terminating at one end in a loop formed in the airbag cushion 11 and terminating at the other end around a restraining pin 82. The restraining pin 82 is provided to secure one end of the internal tether 10 (the end opposite the tether anchor point 21) and the secondary release tether 80 to each other. As illustrated, the airbag cushion 11 is in a deployed state. The secondary release tether 80 becomes taught which pulls the restraining pin 82 out of engagement with the internal "control" tether 10, thereby allowing the airbag cushion 11 to continue expanding to full size.

FIGS. 9-13 illustrate another embodiment of an airbag system. The airbag system includes an airbag cushion 100 formed of at least one fabric panel, an inflator (such as shown in FIG. 2(*a*)), a tether 130 laced or threaded through a sleeve 140.

Figure 9:
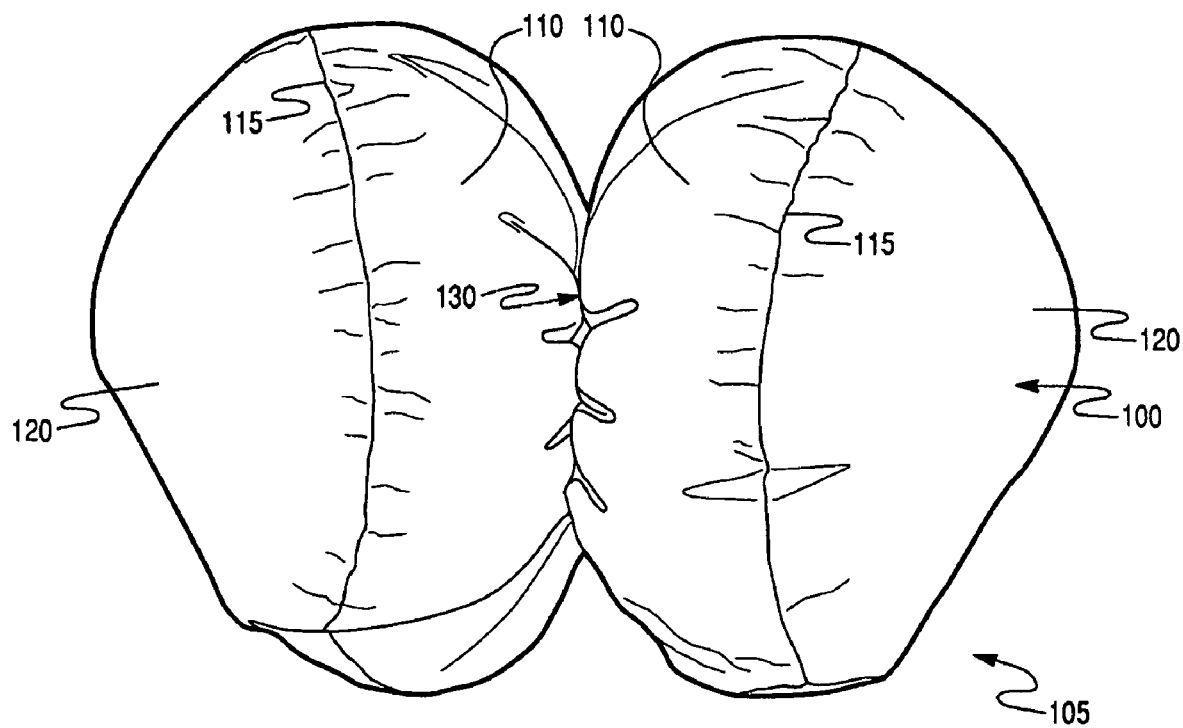
FIG. 9 is a view of an airbag during initial stages of inflation illustrating a tether and sleeve restraining the airbag according to another embodiment.

An airbag cushion 100 to protect an occupant in a vehicle may be installed in a vehicle body part, such as a dashboard, steering wheel, steering column, roof line or A, B, or C columns in a vehicle. FIG. 9 illustrates an airbag cushion 100 that is installed in a dashboard of a vehicle in which the airbag cushion 100 is shown during initial stages of inflation. The airbag cushion 100 includes at least one fabric panel. For example, as shown in FIGS. 9-13, the airbag cushion 100 includes a center fabric panel 110 and left and right fabric panels 120. The fabric panels may comprise any suitable material. The fabric panels 110, 120 are sewn together by sewn seams 115. Alternatively, the airbag cushion 100 may be formed of any number of fabric panels.

Figure 11:
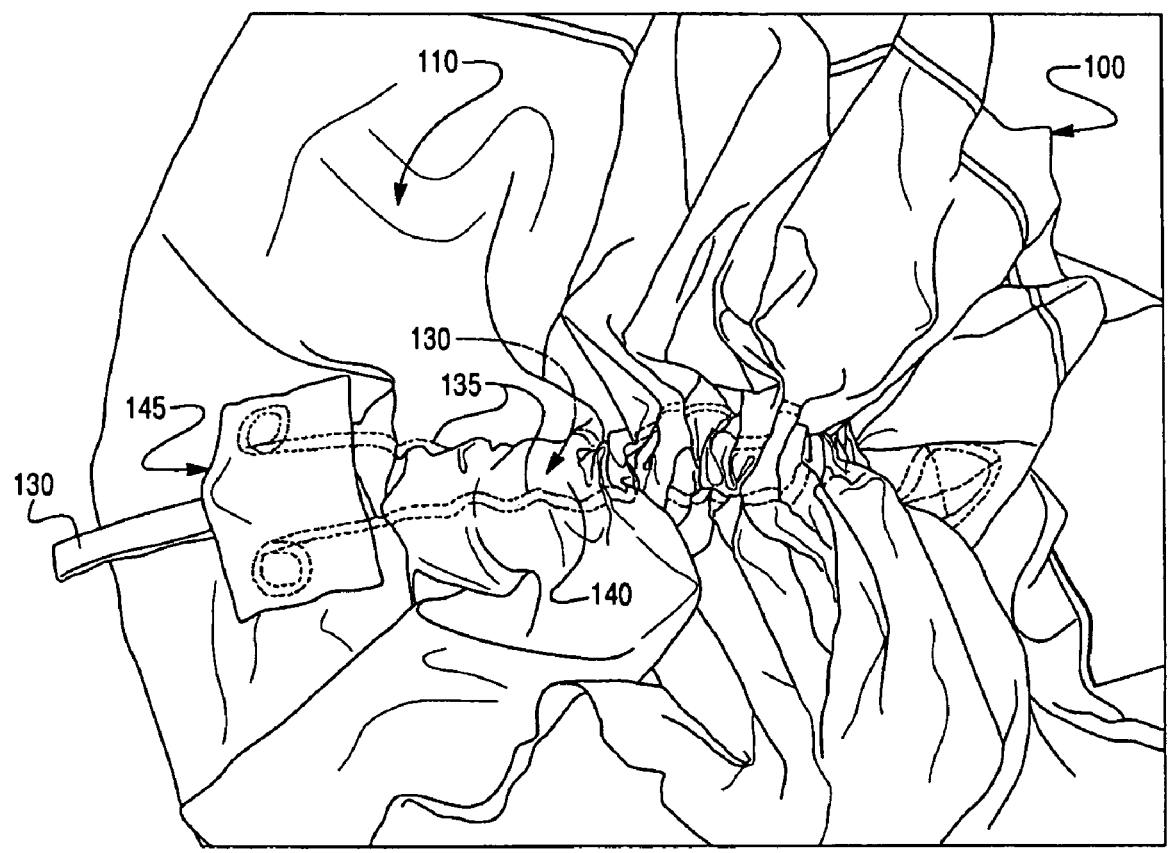
FIG. 11 is an internal view of the airbag of FIG. 9 illustrating the tether and sleeve restraining the airbag.

The sleeve 140 is formed by a piece of fabric, such as airbag panel material, that is attached to an inside surface of the center fabric panel 110 by sewn seams 135, such as shown in FIG. 11. The sleeve 140 includes an opening 145 through which the tether 130 may be inserted. The sleeve 140 can be a continuous piece that is connected to the center fabric panel 110 at one end or the sleeve can comprise multiple short sleeves or loops ("belt loop" version). The sleeve 140 can extend from one end near the inflator to an opposite end at a second location on the fabric panel 110. Alternatively, the sleeve 140 may be connected to one of the side panels 120, or to a plurality of panels 110, 120 depending on desired cushion kinematics.

In embodiments, the sleeve 140 and tether 130 combination can be located on the center panel 110 or the side panel(s) 120 of the airbag cushion 100 and the combination 140, 130 is used initially to severely restrict the cushion 100 volume. More than one sleeve/tether 140, 130 combination can be used depending on the desired cushion 100 kinematics. The sleeve 140 can be constructed of fabric, film, polymer, or other suitable material in a continuous or segmented (open) fashion, and can vary in length and width depending on the desired cushion kinematics. When the sleeve 140 comprises multiple short segments, the combined lengths of the individual short segments determine the cumulative sleeve length.

The tether 130 is positioned between an inner surface of the fabric panel 110 and an inner surface of the sleeve 140. The tether 130, as shown, is one continuous tether. Alternatively, the tether 130 may be segmented. In the example shown, one end of the tether 130 is fixed (by sewing or any other suitable mechanism) to the airbag cushion 100. The opposite end of the tether 130 is connected to a release pin (not shown). The opposite end of the tether 130 may include a loop that connects to the release pin. The release pin is located on or near the inflator (alternatively, the release pin may be located elsewhere in the airbag system).

The tether 130 can be constructed of fabric, webbing, elastic "bungee" type material, rope, cord, or other suitable material. The tether 130 can vary in length and width. The attachment point of the fixed end can vary depending on the desired cushion 100 kinematics. The tether 130 is routed through the sleeve 140 and the releasable end (opposite end) is attached to a pyrotechnically actuated release mechanism (release pin), such as for example, the release mechanisms shown in FIGS. 5-8. The release pin, alternatively, may be electro-mechanically triggered to release.

Figure 10:
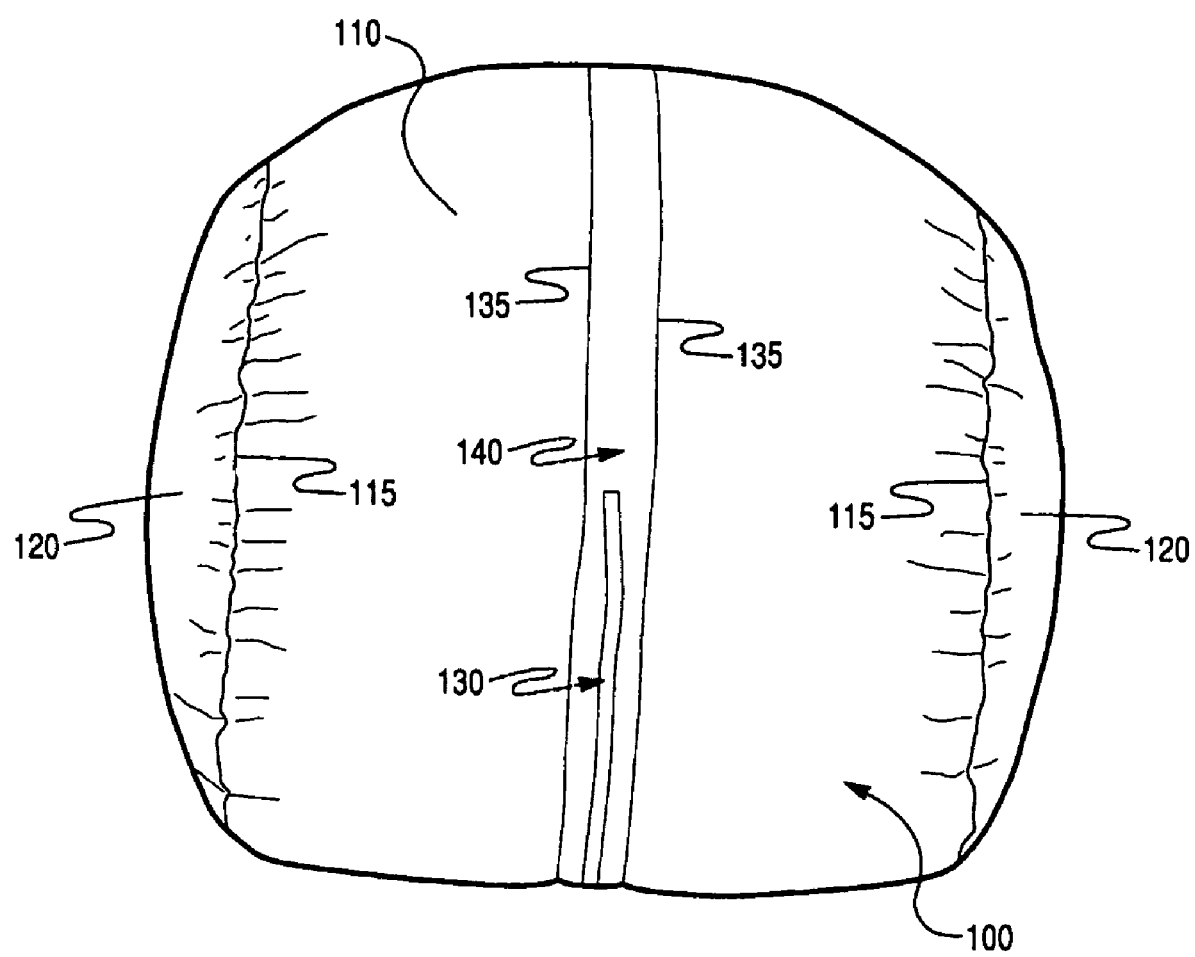
FIG. 10 is a view of the airbag of FIG. 9 in which the tether has been released and the airbag has fully inflated.

During inflation of the airbag cushion 100, the combination of the tether 130 and sleeve 140 cinch or restrain the shape of the airbag cushion 100. For example, as seen in FIG. 9, the airbag cushion 100 forms a split configuration during initial stages of inflation. Depending on the data determined by one or more sensors or on the program of the inflator's controller, the release pin is shifted, thus releasing the loop end of the tether 130. When the loop end of the tether 130 is released, the tether 130 slides through ("unlaces") within the sleeve 140 and the airbag cushion 100 is no longer restrained or "cinched." Thus, the airbag cushion 100 is allowed to reach a fully inflated shaped, such as shown in FIG. 10.

The time at which the release pin is shifted can vary depending on any number of factors. For example, the release time can be preset. Alternatively, the release time can vary depending upon the findings of various sensors.

The initial restriction of the airbag cushion 100 volume limits the "punch out" force that may otherwise occur early in deployment. The rearward excursion of the airbag cushion 100 is also minimized by the restrictive tether 130. Additionally, the restricted volume aids in early venting of inflation gas, which is beneficial in an OOP deployment. As the airbag cushion 100 is initially deployed in a greatly restricted state with its shape controlled by the sleeve 140 and tether 130, the requirement for any type of controlled folding can be negated.

The restricted airbag cushion 100 can be in its initially "breakout" position and venting gas within approximately ten milliseconds of the start of the deployment. Although not shown, the various embodiments of restraining systems disclosed herein may be used in combination with a venting system such as disclosed for example, in U.S. patent application Ser. No. 11/523,810, which is incorporated by reference herein.

At a time that can be adjusted depending on the environment, the tether 130 is released and begins unlacing through the cushion shaping sleeve 140. The release of the tether 140 causes an immediate increase in cushion volume with an attendant drop in pressure, resulting in lower forces being exerted on the occupants in OOP situations.

The "unlacing" (sliding release of tether 130 through the sleeve 140) phenomenon of the tether 130 acting within the sleeve shapes the airbag cushion 100 and causes it to dive down. Cushion kinematics show very little variation, resulting in improved restraint performance of the airbag cushion 100 for all occupant sizes (for example, 5% female to 95% male).

Figure 12:
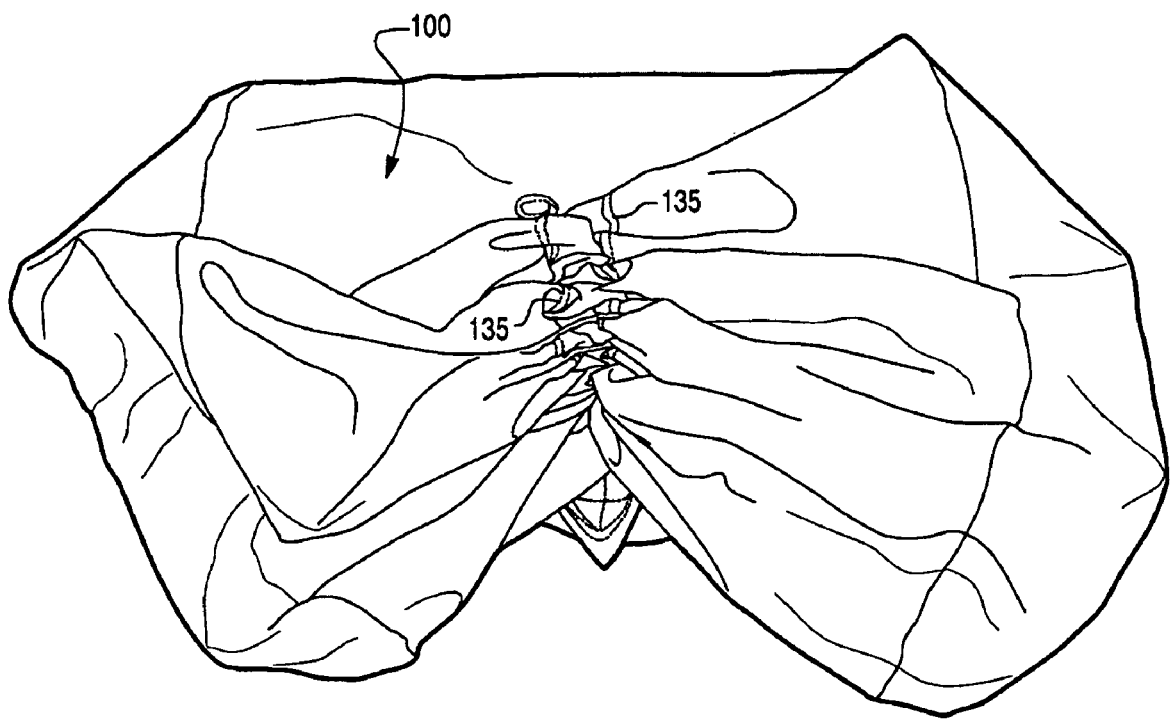
FIG. 12 is an external view of the airbag of FIG. 9 illustrating the tether and sleeve restraining the airbag.
Figure 13:
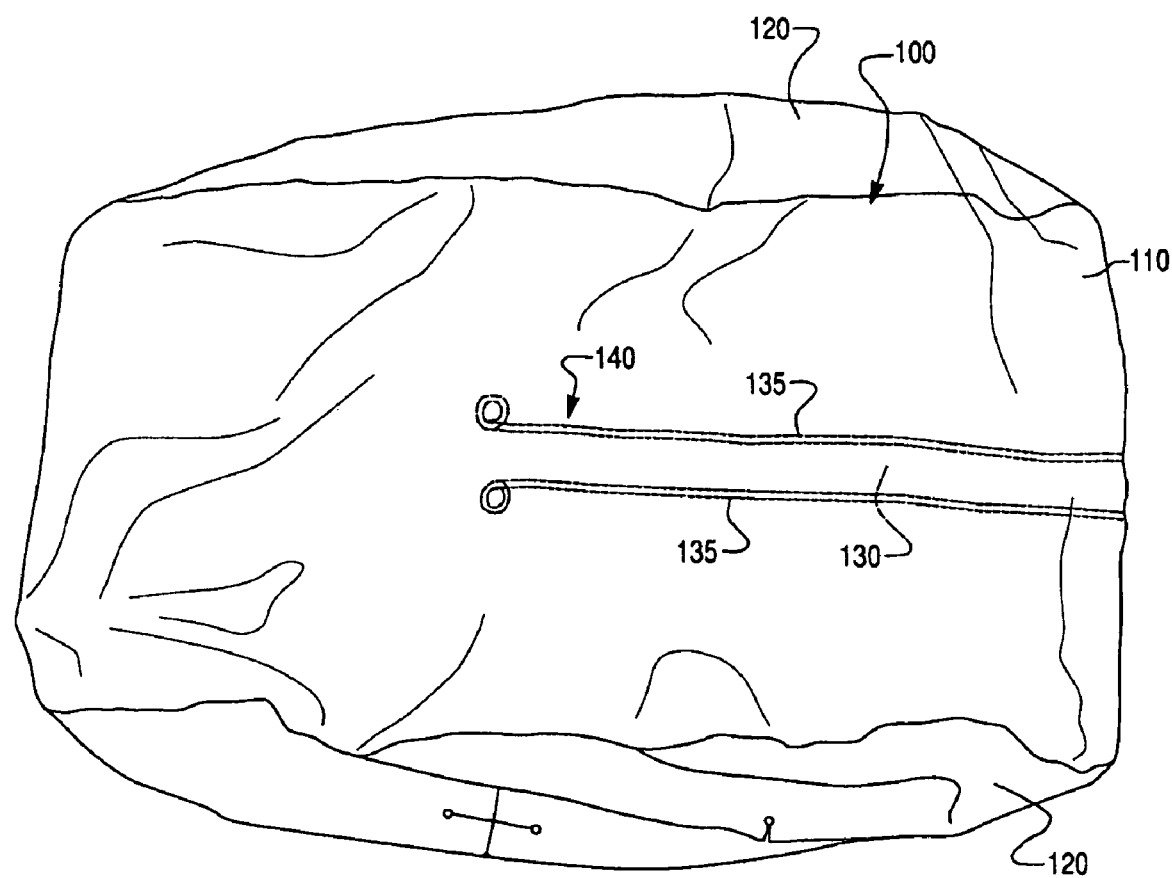
FIG. 13 is an external view of the airbag of FIG. 9 after the tether has been released from the sleeve.

FIGS. 11 and 12 illustrate the airbag cushion 100 when cinched. FIG. 11 is a view of the airbag cushion 100 inside-out (an internal view). FIG. 12 is an external view of the airbag cushion 100. FIG. 13 is a view of the airbag cushion 100 after the tether has been released and the airbag cushion 100 is laying flat.

FIGS. 14-20 illustrate another aspect of exemplary embodiments in which a cushion shaping sleeve 240 and controlling tether 230 combination modify the deployment characteristics of an airbag cushion 200. The sleeve 240 and tether 230 may be located at any location of the airbag cushion 200. For example, the sleeve 240 and tether 230 can be positioned on a center or side panel of the airbag cushion 200. Further, the sleeve 240 and tether 230 may be positioned on an interior or exterior of the airbag cushion 200. In the Figures, the sleeve 240 and tether 230 are shown in the interior position for exemplary purposes only.

Figure 14:
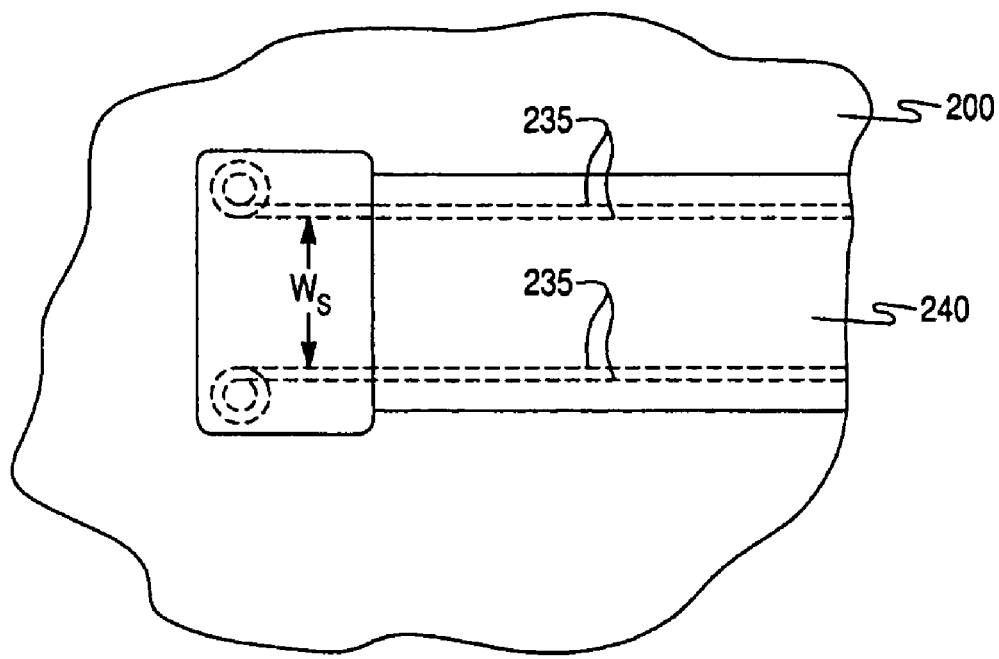
FIG. 14 is an interior view of a portion of an airbag cushion according to another embodiment in which a sleeve is shown.

FIG. 14 illustrates an inside view of a fabric panel forming an airbag cushion 200. The sleeve 240 is formed by a panel of fabric, film, polymer, or other suitable material that is attached to the inside of the airbag cushion 200 via sewn seams 235. The sleeve 240 can vary in length and width and may be formed of segmented components or the sleeve 240 may be continuous.

Figure 15:
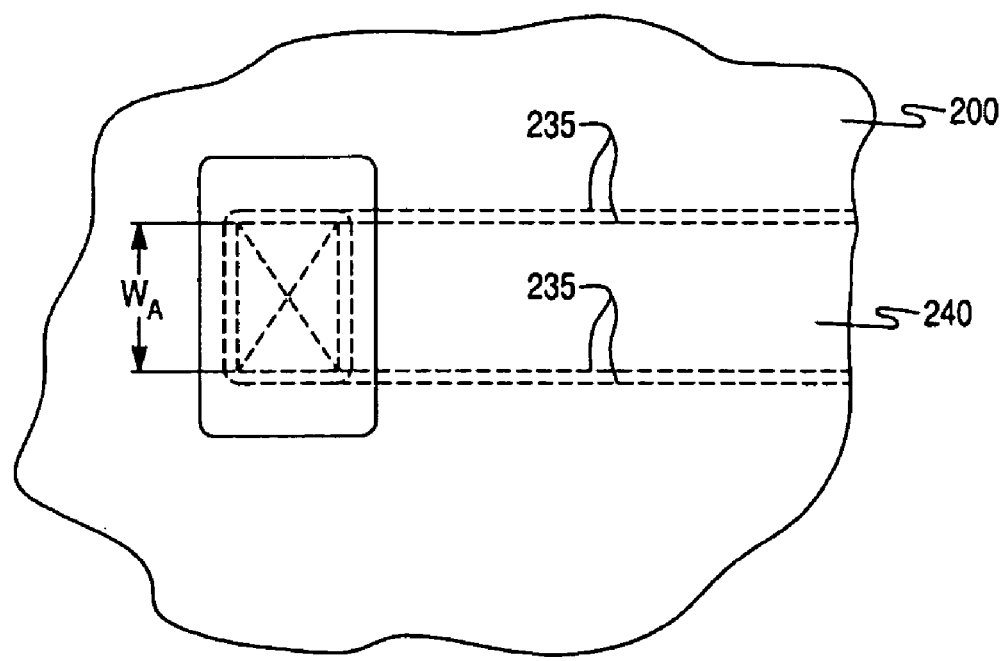
FIG. 15 is an exterior view of the portion of the airbag cushion of FIG. 14 in which an anchor of a tether is shown.

The tether 230 (shown in FIGS. 16-17 and 19-20) is formed of a length, preferably a continuous length, of fabric, webbing, elastic, rope, cord, or other suitable material. One end of the tether 230 is anchored or attached to the airbag cushion 200 by sewn seams or any other suitable attachment mechanism, such as shown in FIG. 15. Alternatively, the anchored end of the tether 230 is anchored and/or connected to an airbag module or housing or vehicle structure either internally or externally. The tether 230 may also be integrated with the airbag cushion 200. The opposite end 231 (see FIG. 19) is free. Thus, the tether 230 is configured to pass within the sleeve 240 with one end anchored to the airbag cushion 200 and an opposite end 231 free. Alternatively, the free end 231 of the tether 230 may be anchored by a pyrotechnically actuated release mechanism with a release pin passing through a loop at the end 231 of the tether 230.

When the airbag cushion 200 deploys, the airbag cushion 200 begins to expand, thus pulling the tether 230 through the sleeve 240. The length and width of the tether 230 and sleeve 240 vary the time for the free end 231 of the tether 230 to pass through the sleeve 240. When the tether 230 is in the sleeve 240, the airbag cushion 200 is restrained at that location. As the tether 230 moves through the sleeve 240 during deployment and the tether 230 unlaces from the sleeve 240, the excess material of the tether 230 is forced to collapse on itself as it moves through the sleeve 240. This can result in higher frictional forces and can slow the movement of the tether 230 through the sleeve 240. As the frictional forces on the tether 230 are reduced, there is an increase in cushion volume (thus, the airbag cushion 200 expands) with an accompanying drop in pressure, thus resulting in lower forces that can be exerted on an occupant in an OOP situation.

Figure 16:
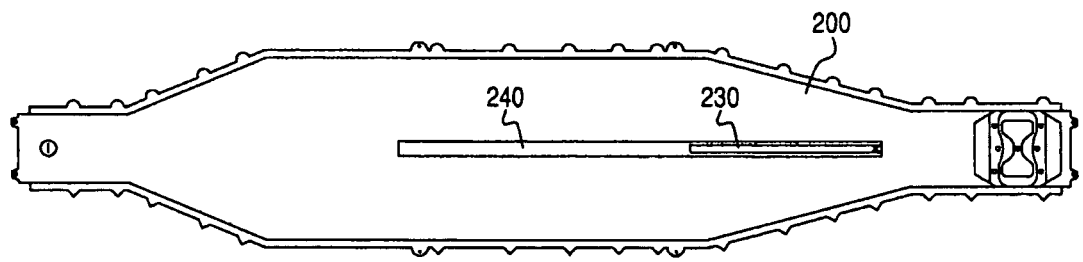
FIG. 16 illustrates a top plan view of a fabric panel for forming an airbag cushion according to another embodiment in which a tether and sleeve are shown.
Figure 17:
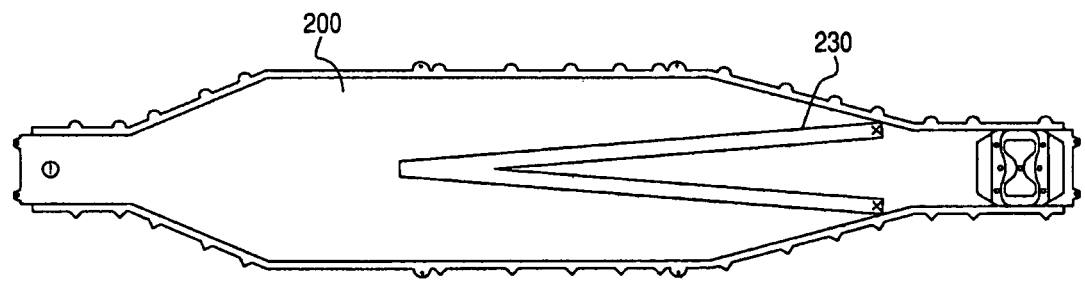
FIG. 17 illustrates a top plan view of a fabric panel for forming an airbag cushion according to another embodiment in which a sleeve is shown.
Figure 18:
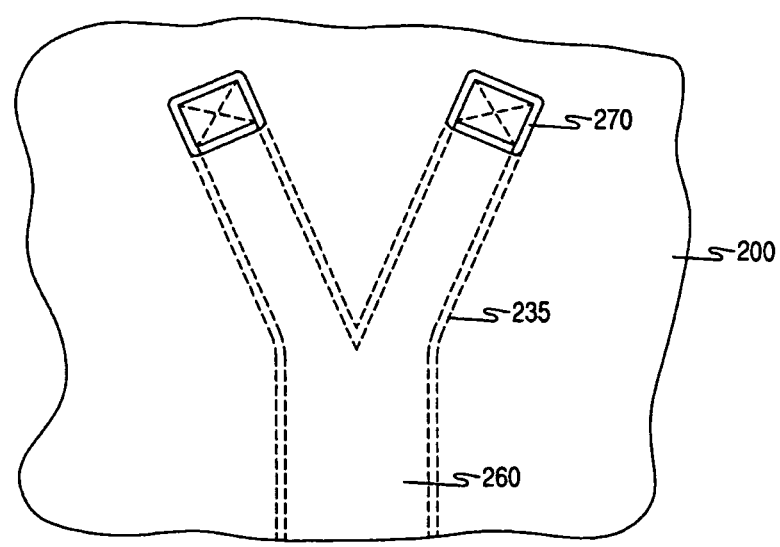
FIG. 18 illustrates an exterior view of a portion of an airbag cushion in which an approximate "Y" shaped sleeve is illustrated.

FIGS. 16-18 illustrate various configurations of the sleeve 240. For example, in FIG. 16, the sleeve 240 is a single, continuous length attached to the inside of the airbag cushion 200. The tether 230, in this example, is shorter than the sleeve 240 and is shown inside the sleeve 240. FIG. 17 illustrates another embodiment of a sleeve 240 in which the sleeve 240 forms an approximate "V" shape. One, two, or more tethers 230 could pass through the sleeve, which could alter the deployment characteristics of the airbag cushion 200. The multiple legs or components of the sleeve 240 form a serpentine path for the tether 230. The number and location of the sleeve 240 components (or separate sleeves 240) can vary depending on desired airbag cushion 200 kinematics. FIG. 18 illustrates a sleeve 260 that forms an approximate "Y" shape. In this example, two tethers may be utilized and anchored to the airbag cushion 200 at anchor points 270.

Figure 19:
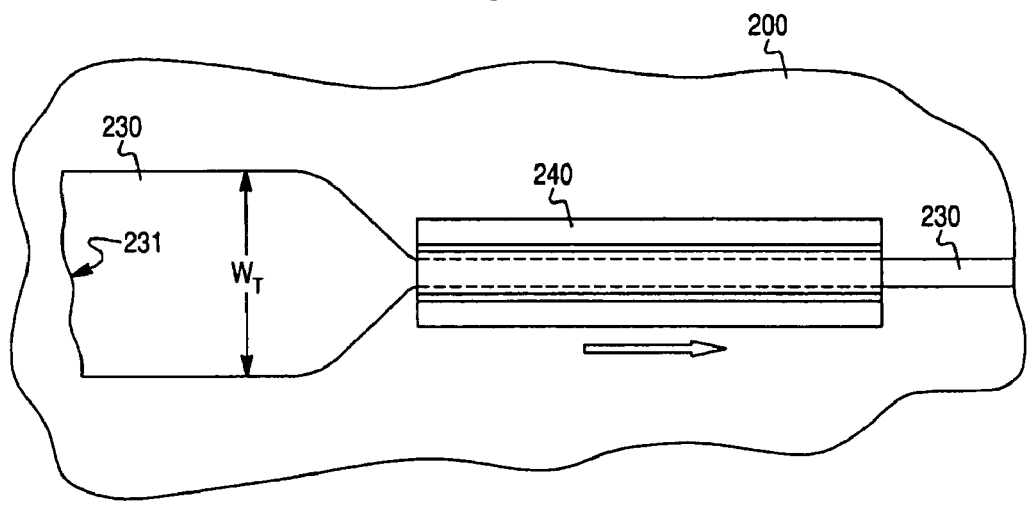
FIG. 19 illustrates an interior view of a portion of an airbag cushion according to another embodiment in which a sleeve and wider tether are shown.

In another embodiment, such as shown in FIG. 19, the width $W_T$ of the tether 230 is greater than the functional width of the sleeve 240. The functional width refers to the distance between the stitches 235 forming the pocket of the sleeve 240. In FIG. 19, the tether 230 unlaces as it is drawn through the narrower sleeve 240. This results in higher frictional forces and slows the movement of the tether 230 through the sleeve 240. Alternatively, the tether 230 can have varying widths, such that one portion of the tether 230 is narrower than the sleeve 240 and other portions that are wider than the sleeve 240.

Figure 20:
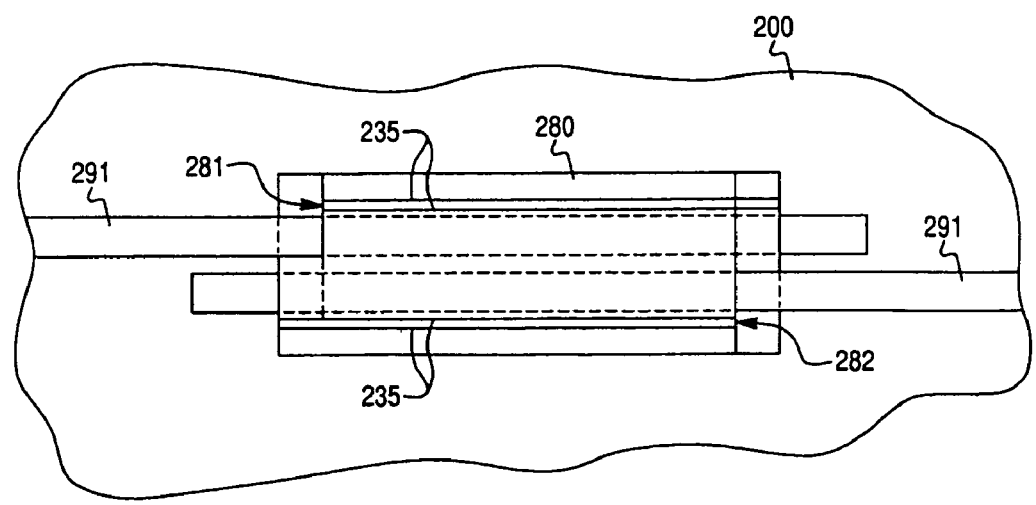
FIG. 20 illustrates an interior view of a portion of an airbag cushion according to another embodiment in which an overlapping sleeve and tethers are shown.

FIG. 20 illustrates yet another exemplary embodiment in which the sleeve 280 includes two overlapping portions 281, 282. A tether 291 passes through a sleeve portion 281. The tether 291 is doubled back on itself and passes through a second sleeve portion 282. The tether 291 is narrower than the width of the sleeve 280. Alternatively, the tether 291 may be wider than the width of the sleeve 280 and/or its respective sleeve portion 281 or 282. The serpentine path of the tether 291 results in higher frictional forces and can slow the movement of the tether 291 through the sleeve 280.

According to embodiments, the length and width of the tether 230 and sleeve 240 can alter the deployment characteristics of the airbag cushion 200. For example, in an embodiment, the width $W_S$ of the sleeve 240 must exceed the narrowest tether width Wt by at least a factor of 1.25. Further, the width $W_A$ of the anchor must exceed the width $W_T$ of the tether 230. In yet another example, if a release pin is utilized to initially restrain an end 231 of the tether 230, the tether loop diameter must exceed the retaining pin diameter by at least a factor of 1.10.

For exemplary purposes only, the tether 230 may have an overall length of about 400 to 600 mm, or about 480 mm. In an embodiment, the functional tether 230 length which extends from an anchor point to a loop (or free end 231) can be 500 to 700 mm, or about 400 mm. The width $W_S$ of the sleeve 240 may be in a range of 20 to 80 mm, or about 40 mm. The width $W_T$ of the tether 230 may be in a range of 5 to 35 mm, or about 15 mm. The width $W_A$ of the anchor of the tether 230 may be in a range of 30 to 80 mm, or about 60 mm. In an alternative embodiment, the cross-sectional area of the sleeve 240 does not increase during deployment of the airbag cushion 200.

According to an embodiment, the tether 230 and sleeve 240 may be located in any suitable location. For example, the sleeve 240 and tether 230 can be internal to the airbag cushion 200 and the tether 230 can be connected to a release mechanism inside the airbag cushion 200. In yet another embodiment, the tether 230 and sleeve 240 are internal to the airbag cushion 200 and the second end 231 of the tether 230 is a free, unattached end. For another exemplary embodiment, the tether 230 and sleeve 240 are internal to the airbag cushion 200 and the tether 230 can be connected to a release mechanism outside of the airbag cushion 200 such that a portion of the tether 230 passes out of the airbag cushion 200.

In alternative embodiments, the tether 230 and sleeve 240 are external to the airbag cushion 200 and the tether 230 can be connected to a release mechanism outside of the airbag cushion 200. Alternatively, the tether 230 and sleeve 240 are external to the airbag cushion 200 and the second end 231 of the tether 230 is a free, unattached end. In yet another embodiment, the tether 230 and sleeve 240 are external to the airbag cushion 200 and the tether 230 can be connected to a release mechanism inside of the airbag cushion 200 such that a portion of the tether 200 passes inside of the airbag cushion 200.

It will be recognized that any number of sleeves and/or tethers may be utilized. Further, the sleeve and tether may be positioned in any location on the airbag cushion and internal or external to the airbag cushion. For example, the sleeve and tether may be at a central or offset location, in a vertical, horizontal, or diagonal position, or any combination of the above. Further, any combination of the above-mentioned tethers and sleeves may be utilized.

Embodiments can eliminate variability in airbag cushion kinematics that can be caused by fold variation. The control sleeve and tether eliminates the need to control the folding of the airbag cushion prior to deployment. Essentially any folding technique can be used without affecting cushion trajectory or kinematics. Thus, embodiments can provide predictable and repeatable airbag cushion kinematics. The "unlacing" phenomenon of the tether within the sleeve causes the cushion to "dive down" resulting in increased occupant protection for all occupant sizes, such as for example, a 5th % female to a 95th % male. Multiple sleeve-tether combinations can be used to steer the airbag cushion, thus improving restraint performance in angular crash scenarios. For example, the tether and sleeve combination can allow the airbag cushion to be in an initial breakout position and venting gas within ten milliseconds of the start of the deployment.

Yet another advantage of embodiments is that the requirement for controlled folding is negated. The airbag cushion may be folded or rolled in any manner to place the airbag cushion in the housing. The tether and sleeve combination control the deployment characteristics of the airbag cushion, not the specific fold method used.

Another possible advantage of embodiments is that airbag cushion deployment variability can be minimized and a "low risk deployment" mode can be provided for out of position occupants and child seats without the need for additional occupant classification sensors, buckle switches, or other sensors.

Embodiments can eliminate the high energy "punch out" of the airbag cushion in the early stages of deployment and provides high and/or low output capability with a single stage inflator.

The inflator to inflate the airbag cushion may be any suitable type of inflator. For example, the inflator may be a single stage or a dual stage.

It will be recognized that the embodiments shown and described are exemplary only. For example, the tether and sleeve may be external such that they are attached to an outside surface of a fabric panel of the airbag.

It will be recognized that the airbag may be a single-lobe, dual-lobe, or any other suitable type of airbag. Furthermore, the airbag may be a knee airbag, driver-side, passenger-side or head-side airbag. The airbag may be installed in any type of vehicle, such as an automobile, train, etc.

One exemplary embodiment of an airbag module includes the following components: a housing; an inflatable airbag cushion being stored in an un-deployed position in the housing; an inflator that inflates the airbag cushion and being in communication with the airbag cushion; a tether element provided surrounding an inside portion of the airbag cushion that restrains the airbag cushion during an initial deployment; and a control mechanism to release the tether element. The module may be a "mid mount" module, referring to the mounting location in the instrument panel of the vehicle.

The airbag cushion may be a twin lobe cushion. The position of the tether element surrounding the inside portion of the airbag cushion may be selected from the group consisting of a central section of the airbag cushion and an offset section of the airbag cushion. The tether element may include multiple parts. The control mechanism may include a device to release the tether element using a control tether. Alternatively, the control mechanism includes a dual stage inflator cutting. In another embodiment, the control mechanism may include a micro-gas generator release mechanism. In such an embodiment, the micro-gas generator release mechanism may be activated by a timer. Alternatively, the micro-gas generator release mechanism may be activated in response to a signal generated by a vehicle velocity sensor. In yet another alternative, the micro-gas generator release mechanism may be activated in response to a signal generated by an occupant detection system. In yet another alternative, the control mechanism may be a "passive" mechanism such that the deployment of the airbag itself controls the movement of the tether in the sleeve.

According to an embodiment, the tether element may be a cable or a strap. The airbag may include tether guide loops provided around an inside periphery of the airbag cushion to accommodate the tether element. Also, the airbag may include a tether anchor point to anchor one end of the tether element.

Figure 21:
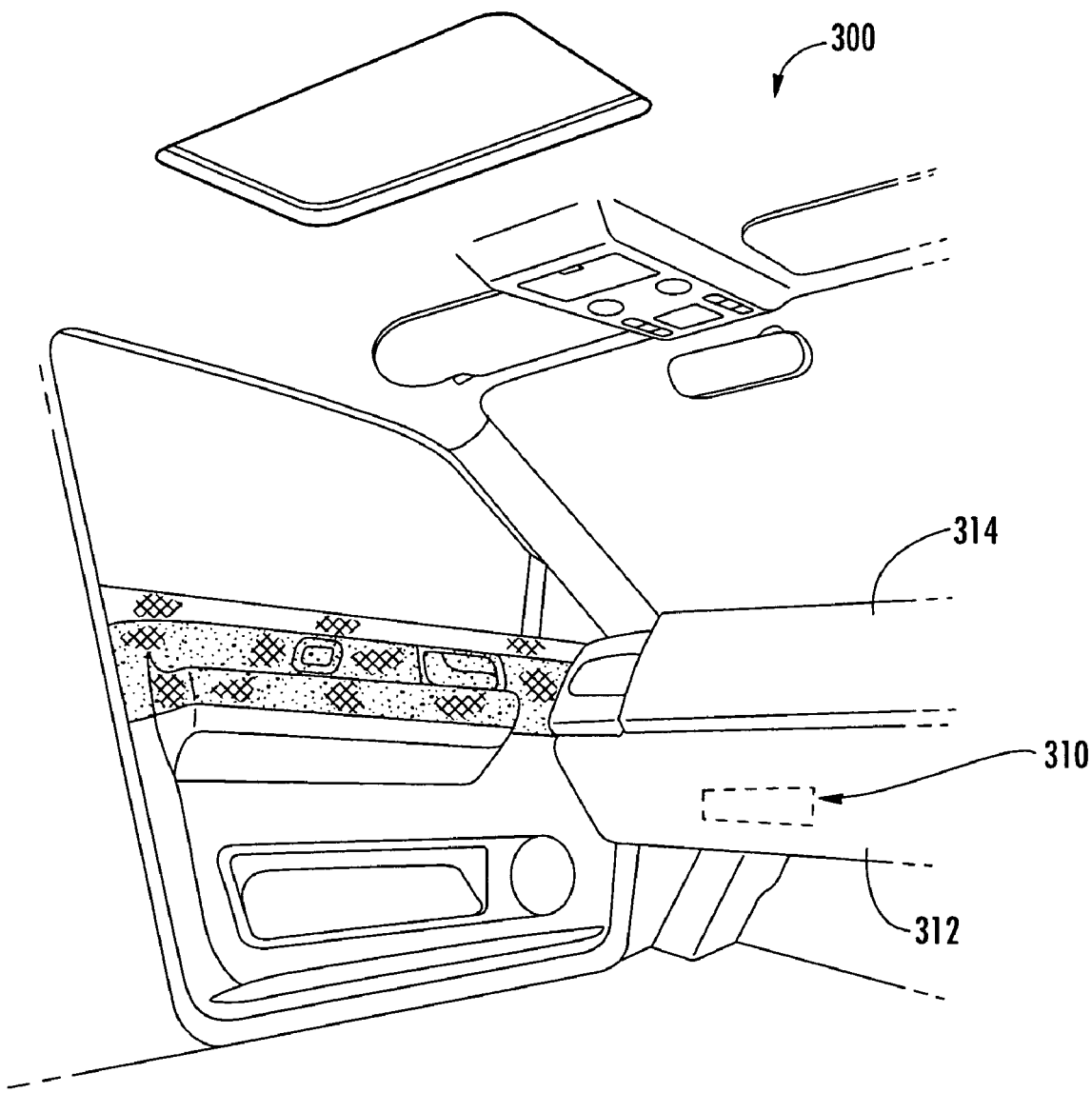
FIG. 21 is an interior perspective view of a vehicle having an airbag module according to an exemplary embodiment.

Referring now to FIGS. 21-25, another exemplary embodiment of an airbag module utilizing the above mentioned technology is shown. FIG. 21 shows an interior perspective of a vehicle 300 that includes an airbag module 310 located in a lower dash 312 that is below the upper dash 314. In an alternative embodiment, airbag module 310 may be located elsewhere in vehicle 300 (e.g., in upper dash 314, etc.). Airbag module 310 may include a housing 308 (as shown in FIGS. 22-25), an un-deployed airbag or cushion (not shown), and an inflator (not shown) in fluid communication with the cushion.

Figure 22A:
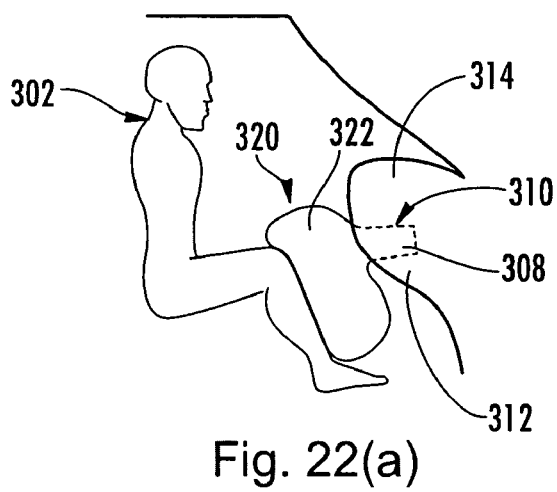
FIG. 22(a) is an illustration of a side view of an airbag after initial deployment according to an exemplary embodiment.

FIG. 22(a) illustrates a cushion 320 after initial deployment to restrain a vehicle occupant 302. A lower portion 322 of cushion 320 is shown to restrain the knees and/or lower body of the occupant 302. The cushion 320 is deployed early in the event of a crash. The cushion 320 is deployed in its restrained condition via a tether 316 as shown in FIG. 22(b), thus lower portion 322 of cushion 320 acts as an inflatable knee bolster.

Figure 22B:
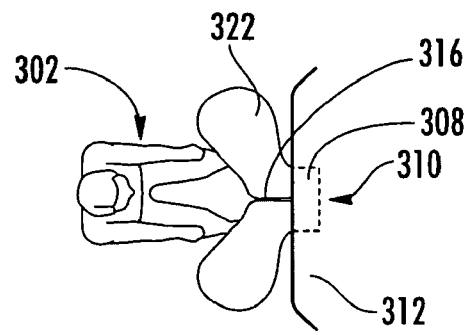
FIG. 22(b) is an illustration of a top view of the airbag shown in FIG. 22(a).

FIG. 22(b) illustrates a top view of the airbag module 310 as shown in FIG. 22(a). The cushion 320 is restrained by tether 316 so that the lower portion 322 of the cushion 320 provides protection to the knees of occupant 302. The relatively small volume of lower portion 322 of cushion 320 will provide a high pressure airbag to keep the pelvis of the occupant 302 restrained in a vehicle seat (not shown), regardless of the seatbelt usage of the occupant 302.

Figure 23:
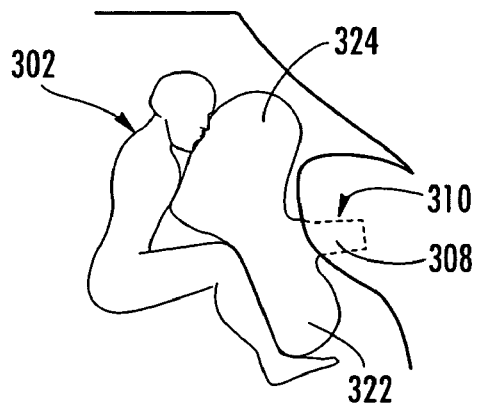
FIG. 23 is an illustration of a side view of the airbag of FIG. 22(a) after further deployment according to an exemplary embodiment.

Once the pelvis of the occupant 302 has been restrained, the cushion 320 will then unlace to deploy an upper portion 324 of cushion 320 so that the cushion 320 now occupies a larger volume, as illustrated in FIG. 23. Occupant 302, whose pelvis has been restrained, will then pivot into the fully inflated cushion 320. The additional volume of the upper portion 324 of cushion 320 reduces the overall air pressure inside the cushion 320, thus reducing the punch out effect of a high pressure airbag, as previously discussed.

Figure 24:
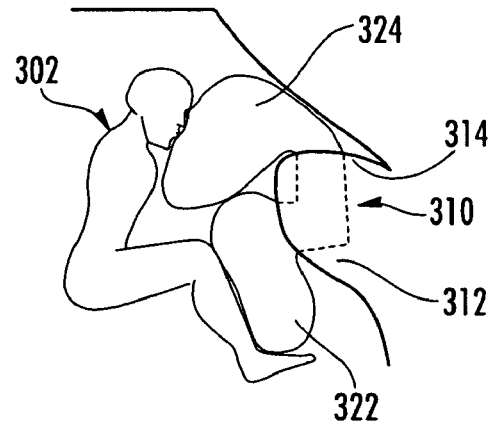
FIG. 24 is an illustration of a side view of the airbag shown in FIG. 22(a) after further deployment according to an exemplary embodiment.

FIG. 24 illustrates an alternative embodiment of the airbag module 310 in that the housing is modified so that the upper portion 324 of the cushion 320 inflates out of the upper dash 314. In this embodiment, the lower portion 322 of cushion 320 inflates out of the lower dash 312 towards the occupant 302 to restrain the knees and pelvis of the occupant 302 as illustrated in FIGS. 22(a)-22(b). The cushion 320 then unlaces (to its second volume) to deploy the upper portion 324 of cushion 320 to offer head and/or upper torso protection to occupant 302. The upper portion 324 of cushion 320 inflates between the windshield and the head and/or upper torso of the occupant 302. In an alternative embodiment, the airbag module 310 may be located elsewhere in the dash. In another alternative embodiment, the dash (rather than just the housing) may be modified to allow the upper portion 324 of cushion 320 to inflate out the top of the dash. In yet another alternative embodiment, the dash and the housing may be modified to allow the upper portion 324 of cushion 320 to inflate out the top of the dash.

Figure 25:
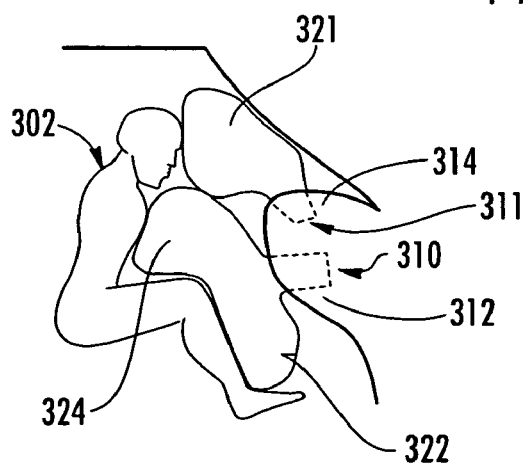
FIG. 25 is an illustration of a side view of the airbag shown in FIG. 22(a) after further deployment according to an exemplary embodiment.

FIG. 25 illustrates yet another alternative embodiment of the airbag module 310 including a second airbag module 311 having a second airbag or cushion 321 inflating out of the upper dash 314. In this embodiment, the first cushion 320 inflates out of the lower dash 312 towards the occupant 302 to restrain the knees and pelvis of the occupant 302 as illustrated in FIGS. 22(a)-22(b). The first cushion 320 then unlaces to its second volume with upper portion 324 of cushion 320 to offer upper torso protection to occupant 302. At the same time as the first cushion 320 unlaces, the second cushion 321 inflates between the windshield and the head of the occupant 302. In this embodiment, the first cushion 320 and second cushion 321 function as one overall unit as the occupant 302 pivots into cushions 320, 321. In an alternative embodiment, second cushion 321 may inflate either before or after the unlacing of the first cushion 320.

In the above embodiments shown in FIGS. 22-25, the inflator (not shown) could be a single stage inflator. Alternatively, the inflator could be a multi-stage inflator used to inflate the lower portion 322 of cushion 320 with a first stage and to inflate the upper portion 324 of cushion 320 with a second stage. The multi-stage inflator would allow more tuning or refinement to be done to the pressure inside the lower and upper portions 322, 324 of cushion 320 and how long and/or how much pressure exists in each of the portions 322, 324 of cushion 320 during the deployment of the airbag cushion 320. In yet another alternative embodiment, a gas diffuser (not shown) may be used to direct a certain percentage of gas into each portion 322, 324 of the cushion 320.

One advantage of the embodiments shown in FIGS. 22-25 is that the design is compatible with OOP and RFIS requirements. When the smaller restrained lower portion 322 of cushion 320 is initially deployed, it will load the OOP occupant's pelvis/abdomen and push the occupant off of the dash or instrument panel before the cushion 320 has had a chance to unlace and come into contact with the occupant's head and/or neck. In a RFIS situation, when the smaller lower portion 322 of cushion 320 deploys, it will come into contact with the sturdy base of the infant seat, and start to push the child restraining system (CRS) back and out of the way by the time that the cushion 320 unlaces.

Figure 26:
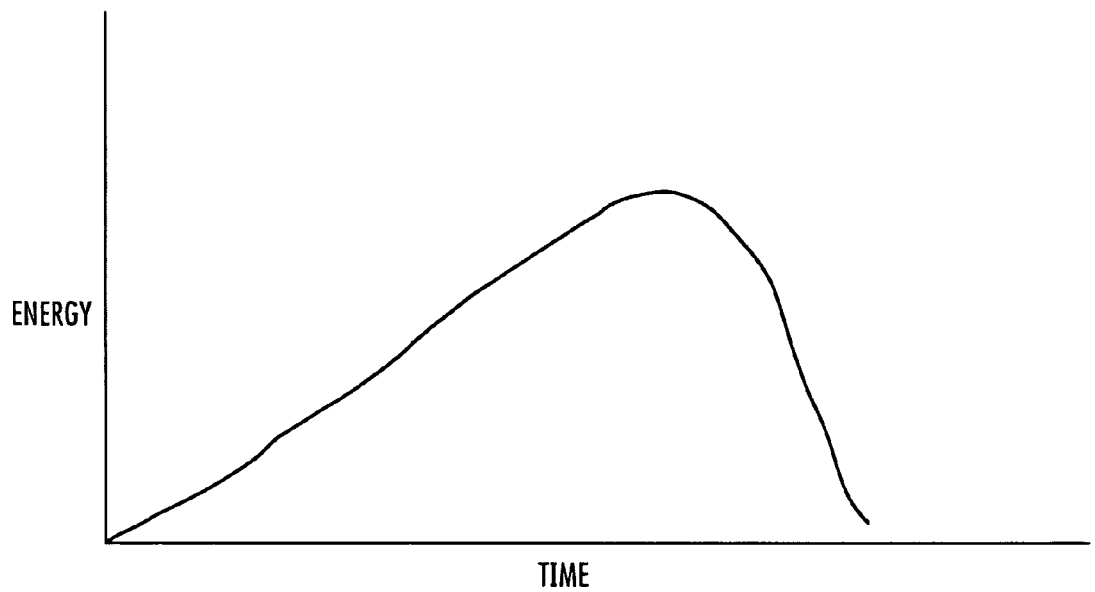
FIG. 26 is a chart of occupant energy absorbed over time for a conventional airbag system.
Figure 27:
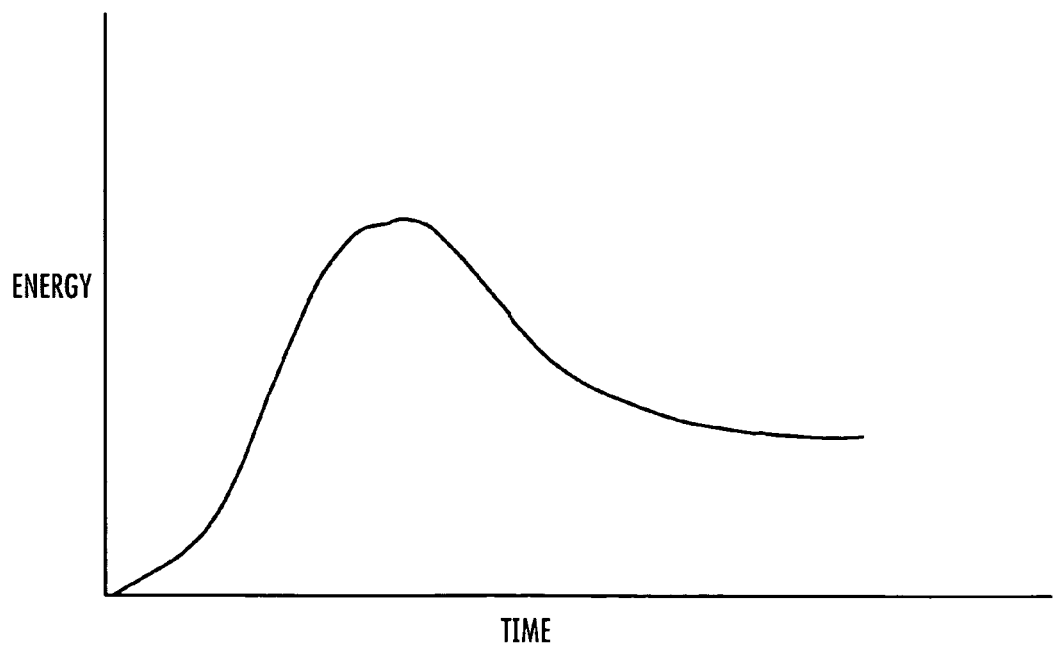
FIG. 27 is a chart of occupant energy absorbed over time for the embodiments shown in FIGS. 21-25.

From an energy management viewpoint, the embodiments shown in FIGS. 22-25 will eliminate more energy early on in the event of a crash as shown in FIG. 27 as compared to a conventional system as shown in FIG. 26. Airbag module 310 will limit the forward movement of an occupant's pelvis relative to the vehicle, allowing the occupant to dissipate more energy through vehicle ride down. With more energy dissipated up front, the upper portion 324 of cushion 320 does not have to be as large as in a conventional airbag system. This is because there will be less energy to absorb as the occupant will be pivoting down into the airbag or cushion instead of translating up into the airbag as in a conventional design.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module for a vehicle, comprising:
   an airbag cushion;
   an inflator to inflate the airbag cushion;
   a sleeve connected to the airbag cushion; and
   a tether configured to pass through the sleeve, wherein a first end of the tether is anchored to a portion of the airbag cushion, module, or a structure of the vehicle and a second, opposite end of the tether is capable of passing through at least a portion of the sleeve during deployment of the airbag,
   wherein the tether and sleeve are configured to initially restrain the deployment of the airbag cushion to provide a knee bolster, after which the tether is configured to unlace within the sleeve to release the restraint on the airbag cushion.

2. The airbag module of claim 1, further comprising a housing located in a lower portion of a dash of the vehicle and configured to receive the airbag cushion in an un-deployed state.

3. The airbag module of claim 1, wherein the airbag is configured to deploy into a position that provides protection to the knees of an occupant and also restrains a pelvis of the occupant.

4. The airbag module of claim 1, wherein a first portion of the airbag cushion deploys out of a lower portion of a dash of the vehicle and a second portion of the airbag cushion deploys out an upper portion of the dash of the vehicle after the tether unlaces from the sleeve.

5. The airbag module of claim 1, further comprising a second airbag cushion, wherein the first airbag cushion deploys out a lower portion of a dash of the vehicle and the second cushion deploys out an upper portion of the dash of the vehicle.

6. The airbag cushion of claim 5, wherein the first airbag cushion and the second airbag cushion function as one overall airbag system.

7. The airbag module of claim 6, wherein the second airbag cushion deploys after the first airbag cushion has unlaced.

8. The airbag module of claim 6, wherein the second airbag cushion deploys at the same time as the first airbag cushion unlaces.

9. An airbag module for a vehicle, comprising:
- an airbag cushion having a first portion and a second portion larger than the first portion; and
- an inflator provided in fluid communication with the airbag cushion;
- wherein the airbag cushion is deployed initially in a restrained state so that only the first portion of the airbag cushion is inflated upon initial deployment of the airbag cushion until the airbag unlaces to deploy the second portion of the airbag cushion;
- wherein the first portion is configured to provide protection to the knees of an occupant and the second portion of the airbag cushion is configured to provide protection to the upper body of the occupant.

10. The airbag module of claim 9, wherein the second portion of the airbag cushion inflates to a lower pressure than the first portion during the restrained state of the airbag cushion.

11. The airbag module of claim 9, wherein the inflator is a multi-stage inflator configured to inflate the first portion of the airbag cushion with a first stage and the second portion of the airbag cushion with a second stage.

12. The airbag module of claim 9, further comprising a housing located in a lower portion in a dash of the vehicle and configured to receive the airbag cushion in an un-deployed state.

13. The airbag module of claim 9, wherein the first portion of the airbag cushion deploys out the lower portion of a dash of the vehicle and a second portion of the airbag cushion deploys out an upper portion of the dash of the vehicle after a tether unlaces from a sleeve.

14. The airbag module of claim 9, further comprising a second airbag cushion, wherein the first airbag cushion deploys out a lower portion of a dash of the vehicle and the second cushion deploys out an upper portion of the dash of the vehicle.

15. The airbag module of claim 14, wherein the first airbag cushion and the second airbag cushion function as an integral airbag system.

16. An airbag system for protecting a vehicle occupant comprising:
- an airbag cushion having a first portion and a second portion larger than the first portion;
- an inflator to inflate the airbag cushion; and
- a housing provided in a lower portion of a dash of the vehicle and configured to receive the airbag cushion in an un-deployed state;
- wherein the airbag is deployed in a restrained state such that only the first portion of the airbag is inflated to provide protection to the knees of the occupant, after which the airbag unlaces to deploy the second portion of the airbag in combination with the first portion of the airbag to provide protection to the occupant.

17. The airbag system of claim 16, wherein the first portion of the airbag is provided at a first pressure upon initial deployment of the airbag and the first and second portions of the airbag are provided at a second pressure upon unlacing of the airbag.

18. The airbag assembly of claim 17, wherein the second pressure is lower than the first pressure.

19. The airbag system of claim 16, further comprising a second airbag cushion, wherein the first airbag cushion deploys out a lower portion of the dash of the vehicle and the second cushion deploys out an upper portion of the dash of the vehicle.

\* \* \* \* \*